United States Patent [19]

Ban

[11] 4,290,685

[45] Sep. 22, 1981

[54] REMOTE CONTROL DEVICE FOR CAMERA

[76] Inventor: Itsuki Ban, 829, Higashi-Oizumi-machi, Nerima-ku, Tokyo, Japan

[21] Appl. No.: 123,650

[22] Filed: Feb. 22, 1980

[51] Int. Cl.³ .......................... G03B 17/38; G03B 9/62
[52] U.S. Cl. ...................................... 354/266; 354/293
[58] Field of Search ................. 352/178; 354/266, 293

[56] References Cited

U.S. PATENT DOCUMENTS

| | | | |
|---|---|---|---|
| 2,949,838 | 8/1960 | Skalabrin | 352/178 X |
| 3,134,547 | 5/1964 | Kapteyn et al. | 354/293 X |
| 3,686,672 | 8/1972 | Ishizuka | 354/266 X |
| 3,805,281 | 4/1974 | Narita et al. | 354/293 X |
| 3,821,769 | 6/1974 | Imura | 354/266 X |

*Primary Examiner*—Donald A. Griffin
*Attorney, Agent, or Firm*—Kenway & Jenney

[57] ABSTRACT

There is described a device for remotely controlling the shutter of a camera. The device includes a housing which incorporates a microphone for receiving an acoustic wave having a relatively high frequency in an audio frequency range, which is generated by a tone generating source, an amplifier circuit for amplifying the output of the microphone, an actuator which is caused to make one reciprocation by the output of the amplifier circuit, and an electric source for energizing the amplifier circuit and the actuator. The device further includes mounting device for fixedly securing the housing to the camera, and a release device for operating the shutter of the camera with the aid of one reciprocation of the actuator.

4 Claims, 13 Drawing Figures

REMOTE CONTROL DEVICE FOR CAMERA

BACKGROUND OF THE INVENTION

This invention relates to a device for remotely controlling the shutter of a camera.

In general, a camera is equipped with a self-timer. A photographing operation with the self-timer is carried out as follows: The camera is mounted on a tripod, and the photographing operation is automatically carried out in a predetermined period of time after the self-timer is set. Thus, a self-timer is extensively employed for a camera.

However, a conventional self-timer is disadvantageous in the following points: Persons to be photographed must be on the strain for 5 to 10 seconds until the shutter is operated, because they cannot foresee the operation of the shutter. For the same reason, it is difficult to have the best shutter chance with the conventional self-timer.

SUMMARY OF THE INVENTION

The above-described drawbacks in the prior art apparatus have been successfully eliminated by the present invention.

A first object of this invention is to provide a remote control device for a camera, in which the above-described difficulties of a conventional self-timer have been eliminated.

A second object of the invention is to incorporate the remote control device of the invention in a part of an electronic flash, a tripod or a grip for a camera, or to incorporate the remote control device in a housing in the form of one unit, thereby to provide an effective technical means.

A third object of the invention is to provide a remote control device for a camera, in which a particular voice of a man is employed as a tone generating source for operating the control device, so that it is unnecessary to carry the tone generating source with the photographer; that is, the remote control device can be operated without the tone generating source.

The foregoing objects and other objects of the invention have been achieved by the provision of a remote control device for a camera, which comprises: a housing incorporating a microphone for receiving an acoustic wave having a relatively high frequency in an audio frequency range, which is generated by a tone generating source, an amplifier circuit for amplifying an output of the microphone, an actuator which is caused to make one reciprocation by an output of the amplifier circuit, and an electric source for energizing the amplifier circuit and the actuator; mounting device for fixedly securing the housing to the camera; and a release device for operating the shutter of the camera with the aid of one reciprocation of the actuator.

These and other objects of the invention will become apparent from the following description of embodiments thereof when taken together with the accompanying drawings.

BRIEF DESCRIPTION OF THE DRAWINGS

In the accompanying drawings:

FIG. 1b is an enlarged explanatory diagram showing a part of the release in the device shown in FIG. 1a;

FIGS. 3a, 3b, and 4 show electrical circuits employed in the device shown in FIG. 1a;

DETAILED DESCRIPTION OF PREFERRED EMBODIMENTS

This invention will be described with reference to its preferred embodiments shown in the accompanying drawings.

Figure 1A:
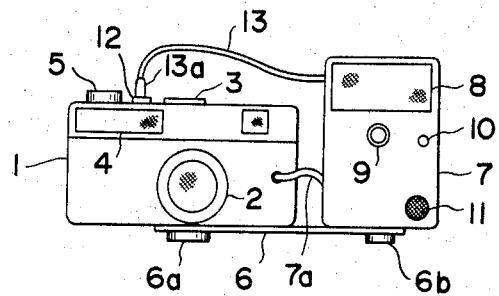
FIG. 1a is an explanatory diagram showing one example of a remote control device for a camera, according to this invention.

In FIG. 1, reference numeral 1 designates a camera; 7, an electronic light-emitting unit (or an electronic flash) mounted on the camera with a coupling bar 6 and screws 6a and 6b; 2, a lens; 3, a shoe; 4, a view finder; 5, a film winding knob; and 7a, a synchronizing cord. The electronic flash is of the conventional light-control type.

Figure 1B:
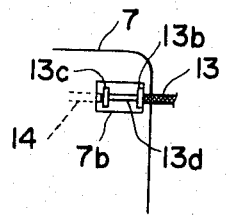

Further in FIG. 1, reference numeral 8 designates the housing of a light-emitting bulb; 9, a light receiving element which receives and integrates light reflected by a subject to be photographed; 10 and 11, a manual push-button switch and a microphone (described later in detail) respectively; and 12, a push-button for operating the shutter, a conventional release 13 being screwed into the push-button 12. The right end portion of the release 13 is mounted to the rear side of the electronic flash 7 as shown in FIG. 1b. More specifically, the electronic flash 7 has a recess 7b, and the right end portion of the release 13 is provided in the recess 7b in such a manner that the flange 13b of the release is on the right side of the recess and the operating end 13c of the release 13 is on the left side. The recess 13 is covered with a lid (not shown) so that these elements do not come off the recess.

In FIG. 1b, reference numeral 14 designates an actuator (which will be described in detail later). When the actuator 14 is moved right (as viewed in the figure), the operating end 13c is also moved right. As a result, the shutter push-button 12 is depressed through a long rod 13d to operate the shutter.

Figure 2A:
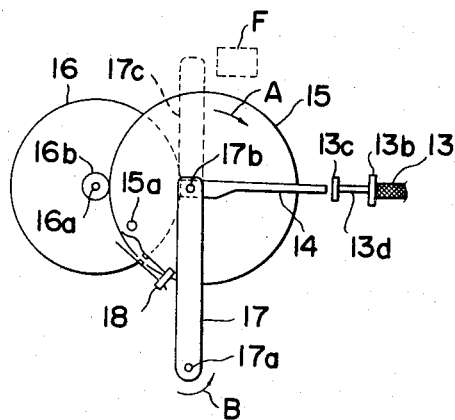
FIGS. 2a and 2b are explanatory diagrams showing mechanisms which operate the release in the device shown in FIG. 1b.

The actuator 14 and its relevant elements will be described with reference to FIG. 2a. A rubber ring 16b is fixedly mounted on the rotary shaft 16a of a DC motor 16 (being a small one having a diameter of about 30 mm). A lever 17 is supported on a supporting rod 17a which is embedded in the flash body, and it is energized by a weak spring (not shown) so that it is urged in the direction of the arrow B. The free end portion of the lever 17 has a supporting rod 17b on which an eccentric idler wheel 15 is supported in such a manner that it is lightly in contract with the rubber ring 16b of the motor 16. The left end portion of the actuator 14 is loosely coupled to the supporting rod 17b, while the right end portion thereof is protruded into the recess 7b as shown in FIG. 1b. The idler wheel 15 has a protrusion 15a which is adapted to touch the actuator of an electrical contact means 18 to close the latter 18.

Figure 3A:
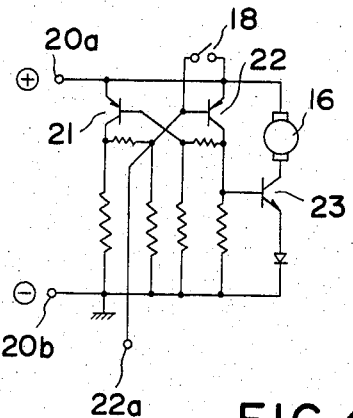

The electric motor 16 has a control circuit as shown in FIG. 3a. The control circuit comprises transistors 21 and 22 forming a flip-flop circuit, and the positive and negative terminals 20a and 20b of a DC source. Upon closure of an electric switch 18, the transistor 22 is rendered non-conductive, while the transistor 21 is rendered conductive. As a result, a transistor 23 is rendered non-conductive, and therefore the motor 16 is not energized. Upon application of the DC power source also, a reset signal is provided, so that the transistor 22 is rendered non-conductive, while the transistor 21 is rendered conductive. When, under this condition, a terminal 22a is grounded, the transistor 22 is rendered conductive, and therefore the state of the flip-flop circuit is changed. Therefore, the base voltage of the transistor 23 is increased, and the transistor 23 is rendered conductive, so that the motor 16 is started and the idler wheel 15 (FIG. 2a) is rotated. When the idler wheel 15 makes one revolution in the direction of the arrow A, the protrusion 15a on the wheel 15 touches the electrical contact means 18 to temporarily close the latter 18. That is, in FIG. 3a, the switch 18 is closed. As a result, the transistor 22 is rendered non-conductive, to stop the electric motor 16.

As is clear from the above description, when the terminal 22a is grounded, the electric motor 16 is started, as a result of which the actuator 14 is caused to make one reciprocation right and left and is then automatically stopped. In this operation, the flange 13c (FIG. 2a) is depressed rightwards. The stronger the pressing force is, the further the actuator 14 is subjected to a force leftwards due to the reaction of the depression. This force results in the eccentric idler wheel 15 strongly abutted against the rubber ring 16b through the actuator thus moved. Thus, power is positively transmitted without causing slip. Since these elements are operated as described above, the elastic force of the spring abutting the idler wheel 15 against the rubber ring 16b may be considerably weak, which may prevent the deformation and deterioration of the rubber ring. If the actuator 14 is removed, then the lever 17 may be extended as indicated by the dotted line 17c so that the end portion of the lever 17 thus extended depresses an object F to be operated, for example, end portion 13c, rightwards.

In the example described above, the rubber ring 16b and the idler wheel 15 are employed; however, the same effect can be obtained by replacing them by plastic gears.

Figure 2B:
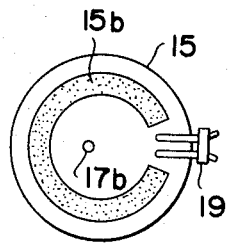

Furthermore, instead of the electrical contact means 18 a sliding contact means as shown in FIG. 2b may be employed. In this case, the idler wheel 15 is made of plastic disc, and an annular conductor 15b (indicated by dots) is provided on the surface of the wheel 15. The idler wheel 15 thus formed is provided with an electrical contact means 19 which is slidably moved on the conductor 15b.

The control circuit will be described with reference to FIG. 3b. When a positive or negative electrical pulse is applied from a terminal 24a in FIG. 3b, a mono-stable circuit 24 is operated, so that a transistor 23 is rendered conductive for a predetermined period of time, to start the electric motor 16, thereby to rotate the idler wheel 15 (FIG. 2b). As the wheel 15 rotates, the contact means 19 is brought into contact with the conductor 15b; that is, it is closed, so that the operation of the motor 16 is continued. When the wheel 15 makes one revolution, the switch 19 is opened, so that the motor 16 is automatically stopped. Thus, the control circuit has the same effect.

As is apparent from the above description, upon application of the input to the terminal 24a, the actuator 14 stops after making one reciprocation.

The above-described operation can be effected with a conventional electro-magnetic plunger; however, this manner is disadvantageous in the following points. First, the manner needs large circuit, although the large current is applied for a very short period of time. For instance, in order to obtain a force of 1 kg with a stroke of 5 mm, it is necessary to provide a power of about 12 v×2 A. Therefore, if the power source is a battery, the manner cannot be utilized. Second, large impact sound is generated during the operation.

Use of the devices shown in FIG. 2 employed in the invention can completely eliminate the above-described two difficulties.

It is preferable to apply electromagnetic braking to quickly stop the electric motor. This can be achieved by a method in which for instance a transistor is connected in parallel to the electric motor 16, and a control circuit which, upon deenergization of the motor, renders the transistor conductive automatically in a well known manner is employed.

An electrical circuit shown in FIG. 4 to be employed as an imput control means to terminal 22a of the circuit in FIG. 3a will be described.

Figure 4:
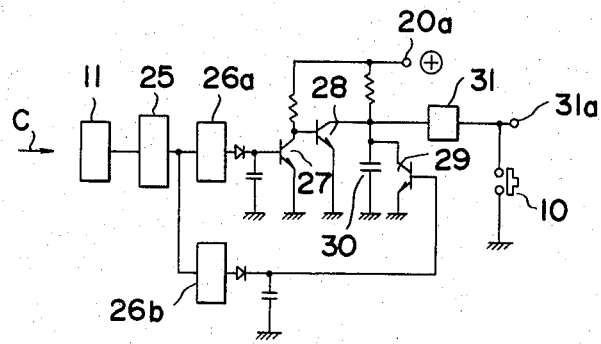

In FIG. 4, an acoustic wave is applied to a microphone 11 in the direction of the arrow C, where it is converted into an electrical signal. The electrical signal is amplified by an amplifier circuit 25, the output of which is applied to a high-pass filter circuit 26a which transmits signals above about 5 KHz. The output of the filter circuit 26a is rectified and smoothed. The output thus treated is applied to the base of a transistor 27. A transistor 28 is maintained conductive to short-circuit a capacitor 30. However, when the transistor 27 is rendered conductive, the transistor 28 is rendered non-conductive, as a result of which the capacitor is charged through the positive terminal 20a of the power source. When the voltage across the capacitor is increased to a predetermined value, then a Schmitt circuit 31 is triggered to provide a negative output at the terminal 31a. The time constant of the circuit are so predetermined that the output is provided at the terminal 31a in at least 0.5 second after the filter circuit 26a provides its output.

Figure 5:
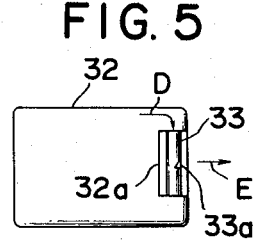
FIG. 5 is an explanatory diagram showing a whistle which is employed as a tone generating source.

The tone source of the acoustic wave applied to the microphone in the direction of the arrow C may be one as shown in FIG. 5. In FIG. 5, reference numeral 32 designates a rubber bag with an opening 32a into which a plastic whistle 33 is inserted. When the bag 32 is squeezed with the fingers, then the air in the bag is pushed into the whistle 33 in the direction of the arrow D and is ejected out of the hole 33a of the whistle in the direction of the arrow E, thus generating sound. The whistle is so selected that the generated acoustic wave is of the order of 10 to 20 KHz.

Use of the whistle shown in FIG. 5 as the tone source permits the following operation:

The electronic flash (FIG. 1) coupled to the release 13 incorporates not only its own light-emitting means but also the device shown in FIG. 2 and the electrical circuits shown in FIGS. 3 and 4. The microphone 11 in FIG. 1 is the same as that indicated in FIG. 4.

When the camera is supported on the tripod and subjects to be photographed which are persons including the operator or photographer are ready, the bag 32 (FIG. 5) is squeezed to generate the acoustic wave. As a result, the filter 26a provides the outputs. More specifically, where the acoustic wave is generated by the whistle for at least 0.5 second, the output is provided at the terminal 31a. This output is applied to the terminal 22a of the electrical circuit in FIG. 3a. Therefore, after making one reciprocation, the actuator 14 is stopped. Thus, the shutter of the camera is operated to take a picture.

As is clear from the above description, a remote control device is provided by the invention; however, it should be noted that the device can be used in place of the self-timer of a camera, and it, unlike the self-timer, can select shutter chance as desired. That is, the device according to the invention has a merit that it is possible to take pictures of subjects when the subjects are in best state.

Figure 3B:
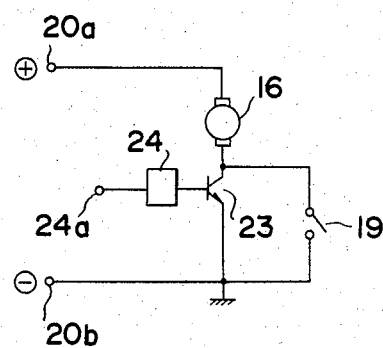

The output provided at the terminal 31a in FIG. 4 may be applied to the terminal 24a in FIG. 3(b), for the same result. In this case, the provision of the mono-stable circuit 24 is not always necessary. That is, even if the mono-stable circuit 24 is removed, the output is continuously provided to the terminal 31a for more than 0.5 second, during which the electrical switch 19 is closed to continuously energize the electric motor 16. In this operation, the output at the terminal 31a in FIG. 4 should be a positive voltage.

In the above-described example, the whistle 33 (FIG. 5) is used. However, a fricative (long-breathed) one as of phonetic sign "∫" which is generated when air (breathing) passes between the upper jaw and the tongue of a person may be employed as the tone source. The frequency of the fricative thus generated is of the order of 6 KHz. According to the experiments, the fricative is effective because remote control can be effected at a position about 5 mm away. The use of a means such as a whistle 33 described above makes it possible to reduce the size and weight of the device; however, utilization of the fricative generated by the mouth of a man is more convenient because the photographer can generate it at any time; i.e., he has a means for generating the sound at all times.

The push-button 10 in FIG. 1 is equal to a push-button 10 in FIG. 4. Upon depression of the push-button 10, the terminal 31a is grounded to operate the flip-flop circuit in FIG. 3 thereby to take a picture. The capacitor 30 in FIG. 4 is charged to form a time constant circuit; however, the same object can be achieved by discharging the capacitor which has been charged.

The specific feature of the circuit shown in FIG. 4 will be described. The circuit is so designed that, as was described before, it operates when the acoustic wave is inputted continuously for at least 0.5 second. That is, even if a strong impact sound such as a hand clapping sound or a sound generated when an object is dropped is generated, no error signal which may erroneously operate the circuit is produced. Furthermore, even in the case where short acoustic waves such as those described above are repeatedly applied, the transistor 28 is rendered conductive to discharge the capacitor, so as to prevent the production of the error signal which is caused by the integration of the short acoustic waves. This is the significant feature of the circuit.

An acoustic wave having a wide frequency band such as the sound of a vaccum cleaner, the sound of a telephone bell, or the cry of a small baby always includes low frequency components sufficiently. Therefore, such an acoustic wave causes a low-pass filter 26b to provide an output. The output renders a transistor 29 conductive to discharge the capacitor 30, thus preventing the production of the error signal. Thus, the above-described error signal preventing means prevents acoustic waves generated in the normal living environment from becoming the error signal; that is, the device according to the invention operates only with the sound of the whistle shown in FIG. 5 or the fricative generated by the mouth. Furthermore, since the device can be cooperated with the electronic flash, the device should be highly appreciately in the technical view point.

Figure 6:
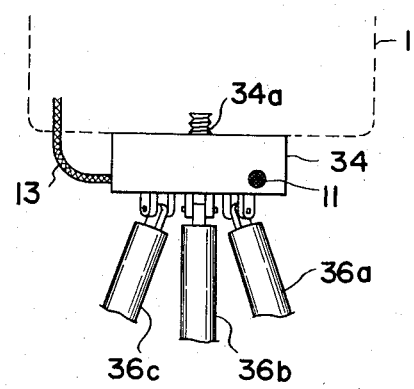
FIGS. 6 and 7a-7d are explanatory diagram showing another example of the device according to the invention.

When the camera is operated with a self-timer, a tripod is always used. The devices shown in FIGS. 2, 3 and 4 can be effectively incorporated in the tripod head as shown in FIG. 6. In FIG. 6, reference numeral 1 designates a part of a camera. The camera 1 is screwed on a screw 34a of the tripod head 34. The release 13 is coupled to the shutter push button (not shown). Furthermore in FIG. 6, reference numeral 11 designates the aforementioned microphone; and 36a, 36b and 36c, the three legs of the tripod, respectively.

Similarly as in the above-described example, the sound generated by the whistle 33 in FIG. 5 is received by the microphone and the photographing operation is carried out. The effects in this case are similar to those in the above-described example.

The same effects can be obtained by incorporating the devices shown in FIGS. 2, 3 and 4 in the grip of the camera.

Figure 7A:
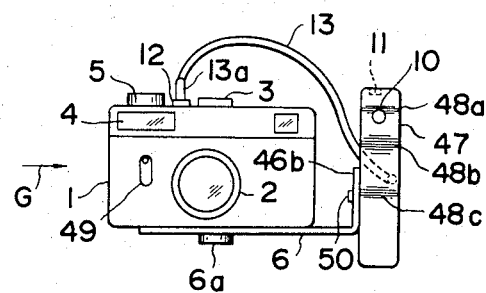

In FIG. 7a, reference numeral 1 designates a camera; 47, a grip which is coupled to the camera through a coupling plate 6, a screw 6a and the vertical portion 46b of the coupling plate 6; and 2, 3, 4 and 5, a lens, a shoe, a finder, and a film winding knob, respectively. The coupling plate 6 is detachably mounted on the camera 1 with the screw 6a. A release 13, a push-button switch 10, and a microphone 11 will be described latter. The grip 47 is operatively locked to the vertical portion 46a of the coupling plate 6 in FIG. 7a; however, it may be rotatably mounted on the vertical portion 46a as shown in FIG. 7b.

Figure 7B:
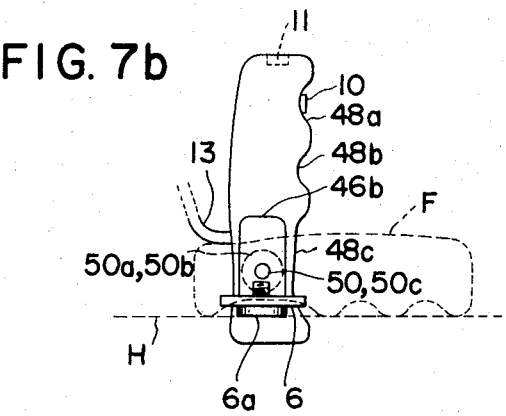
Figure 7C:
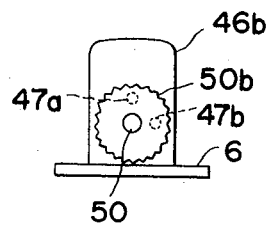
Figure 7D:
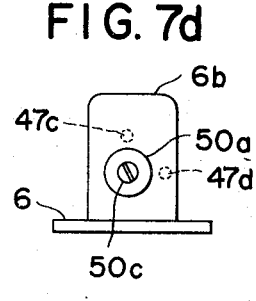

FIG. 7b is a diagram as viewed in the direction of the arrow G in FIG. 7a. The grip 47 is made of plastic by molding. A male-threaded supporting rod 50 is protruded from the grip body. The male screw 50 is loosely fitted into the vertical portion 46b of the coupling plate, so that the grip 47 can be freely rotated with respect to the vertical plate 46b. However, it should be noted that the rotation of the grip is limited as follows: The male screw 50 is embedded in the grip 47, and a female screw 50b mating the male screw 50 is provided. In FIG. 7, reference character 47a designates a recess formed in the rear surface of the vertical plate 46b. The recess 47a is adapted to engage with a protrusion of the grip 47. That is, the recess 47a is provided to fixedly secure the grip 47 to the vertical plate 46b when the aforementioned screws are engaged together. In order to turn the grip 47 as indicated by the dotted line F in FIG. 7b, first the female screw 50b is loosened to turn grip 47 forwardly of the camera, and then the screw 50b is tightened, in such a manner that the recess formed in the vertical plate 46b comes to a position indicated by reference character 47b so as to engage with the protrusion of the grip, which is provided at the position 47b. Thus, the grip is held horizontal at the position indicated by the dotted line F, while the camera is held vertical on a horizontal base H indicated by the dotted line. In FIG. 7b, reference characters 48a, 48b and 48c designate recesses formed in the grip 47, on which the fingers are placed when the grip 47 is held by the hand. It is obvious that when the grip 47 is held vertical, it can be used as an ordinary grip.

In the case of taking pictures by using the self-timer, the grip 47 is turned to the position F indicated by the dotted line, and the grip 47 and the camera 1 is placed on the horizontal base H. Preferably, in this case, the surfaces of the recesses 48a, 48b and 48c of the grip and a screw 6a can be stably placed on the horizontal base.

In general, the lens 2 of the camera 1 is protruded forwardly. Therefore, if only the camera 1 is placed on a base, the camera 1 will fall forwardly. However, this difficulty can be eliminated by employing the above-described means according to the invention. If, under this condition, the self-timer lever 49 in FIG. 7a is operated, then the self-timer is actuated to perform a photographing operation. In an ordinary photographing operation, the horizontal base H can be readily found; that is, a chest, a table or the like can be used as the horizontal base.

As is clear from the above description, the device according to the invention makes it possible to take picture by using the self-timer even when no tripod is available, or without using the tripod. Furthermore, the device can be used as the grip of the camera. In addition, the device has a merit that the camera can be stably placed on a stand.

A means for remotely controlling a photographing operation by using the grip 47, will be described.

In FIG. 7a, reference numeral 10 designates a push button switch; 11, a microphone (which will be described later in detail); and 12, a push button for operating the shutter. A conventional release 13 is coupled to the push button 12, as shown in FIG. 1b.

A battery, i.e. a power source, the release 13, the device shown in FIG. 2, and the electrical circuits shown in FIGS. 3 and 4 are incorporated in the grip 47 shown in FIG. 7. The microphone shown in FIG. 7 is similar to that shown in FIG. 1.

When, after the grip 47 is turned forwardly, persons including the photographer become ready, the whistle 33 in FIG. 5 is operated or the fricative is generated by using the mouth. As a result, similarly as in the above-described case, the camera shutter is operated for taking a picture. Furthermore, the photographing operation can be carried out by depressing the push button switch 10 similarly as in the above-described case.

In the above-described example, the microphone 11 is provided on top of the grip 47; however, it may be provided at the upper front portion of the grip 47. Furthermore, in the above-described example, the release is detachably coupled to the grip 47; however, it may be fixedly secured to the grip 47.

The above-described remote control device is built in a part of the electronic flash, the tripod, or the grip as described above, however, if it is incorporated in a case as one unit, then the remote control device can be used by being fixedly secured to the bottom of the camera with the screw 6a.

Thus, there is provided in accordance with the invention, a remote control device for a camera, which has the advantage discussed above. The embodiments described are intended to be merely exemplary and those skilled in the art will be able to make variations and modifications in them without departing from the spirit and scope of the invention. All such modifications and variations are contemplated as falling within the scope of the claims.

What is claimed is:
1. A remote control device for a camera, which comprises:

a housing incorporating a microphone for receiving an acoustic wave having a relatively high frequency in an audio frequency range, which is generated by a tone generating source, an amplifier circuit for amplifying an output of said microphone, a control circuit which applies an output of said amplifier circuit to a high-pass filter and a low-pass filter, and when said high-pass filter provides no output or said low-pass filter provides an output, stops the charging or discharging of a capacitor, and when only said high-pass filter provides an output, allows the charging or discharging of said capacitor, and a circuit for operating a shutter of said camera with the aid of an electrical signal which is provided when a voltage across said capacitor reaches a predetermined value, and an electric source for energizing said amplifier circuit; and mounting means for fixedly securing said housing to said camera.

2. A remote control device for a camera, which comprises:

a grip which is utilized as a housing incorporating a microphone for receiving an acoustic wave having a relatively high frequency in an audio frequency range, which is generated by a tone generating source, an amplifier circuit for amplifying an output of said microphone, a circuit for operating a shutter of said camera with the aid of an electrical signal of said amplifier circuit and an electric source for energizing said amplifier circuit; and mounting means for rotatably securing said grip to said camera so as to hold the grip in a position selectable from either of the following: vertical or horizontal.

3. A remote control device for a camera as claimed in claim 2, in which the microphone is provided on top of the grip.

4. In a remote control device for a camera, comprising:

a housing incorporating a microphone for receiving an acoustic wave having a relatively high frequency in an audio frequency range, which is generated by a tone generating source, an amplifier circuit for amplifying an output of said microphone, actuator means which is caused to make one reciprocation by an output of said amplifier circuit, and an electric source for energizing said amplifier circuit and said actuator means;

mounting means for fixedly securing said housing to said camera; and release means for operating the shutter of said camera with the aid of one reciprocation of said actuator means, the improvement wherein said actuator means comprises:

a rotary ring having a relatively small diameter, which is mounted on the rotary shaft of an electric motor; an eccentric rotary wheel having a relatively large diameter, said rotary wheel being lightly in contact with rotary ring; a lever supporting the rotary shaft of said rotary wheel at one end; and a supporting rod which rotatably support the other end of said lever on a body of said remote control device, so that said actuator means is caused to make one reciprocation by one reciprocation of said lever, and which further comprises a control circuit which rotates said electric motor in response to an output of said amplifier, and stops said electric motor when said eccentric rotary wheel makes one revolution.

* * * * *